United States Patent
Dixon et al.

(10) Patent No.: US 9,522,724 B2
(45) Date of Patent: Dec. 20, 2016

(54) ROLLER COVERS AND ASSEMBLIES

(71) Applicant: The Boeing Company, Huntington Beach, CA (US)

(72) Inventors: Robert Dean Dixon, Everett, WA (US); Maksim Adzhigirey, Bothell, WA (US); Isaac B. Schaff, Everett, WA (US); Craig B. Morgan, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 165 days.

(21) Appl. No.: 14/531,772

(22) Filed: Nov. 3, 2014

(65) Prior Publication Data

US 2016/0121994 A1 May 5, 2016

(51) Int. Cl.
*B64C 1/20* (2006.01)
*B64D 9/00* (2006.01)

(52) U.S. Cl.
CPC . *B64C 1/20* (2013.01); *B64D 9/00* (2013.01); *B64D 2009/006* (2013.01)

(58) Field of Classification Search
CPC ........ B64C 1/20; B64D 9/00; B64D 2009/006
See application file for complete search history.

(56) References Cited

U.S. PATENT DOCUMENTS

| | | | |
|---|---|---|---|
| 1,931,695 A * | 10/1933 | Hall | E05C 19/063 16/85 |
| 2,176,793 A * | 10/1939 | Fry | H01R 13/68 337/198 |
| 3,209,880 A | 10/1965 | Dietiker | |
| 3,753,541 A | 8/1973 | Grueber et al. | |
| 4,072,431 A * | 2/1978 | Waight | F16C 11/0614 403/149 |
| 4,802,572 A | 2/1989 | Shorey et al. | |
| 5,239,729 A * | 8/1993 | Scholl | B65F 1/1646 16/231 |
| 5,697,125 A * | 12/1997 | Gannon | E05D 11/082 16/342 |
| 6,269,939 B1 * | 8/2001 | Lapeyre | B65G 21/00 198/615 |
| 9,278,752 B2 * | 3/2016 | Osvog | B64C 9/02 |
| 2005/0271494 A1 * | 12/2005 | Hidalgo | F16B 39/10 411/121 |
| 2010/0038206 A1 * | 2/2010 | Kulesha | B64C 1/20 193/35 TE |
| 2015/0267734 A1 * | 9/2015 | Boyer | F16B 37/043 411/520 |

* cited by examiner

*Primary Examiner* — Justin Benedik
(74) *Attorney, Agent, or Firm* — Dascenzo Intellectual Property Law, P.C.

(57) ABSTRACT

Roller covers for use with cylindrical rollers include an elongate flexible hollow body defining an interior space with an opening to the interior space for receiving the cylindrical roller via the opening, a first restrictive feature extending from the body and configured to restrict rotation of the body in a first rotational direction when the cylindrical roller is received in the interior space, and a second restrictive feature extending from the body and configured to restrict rotation of the body in a second and opposite rotational direction when the cylindrical roller is received in the interior space. Some embodiments further include a third restrictive feature positioned relative to the body and configured to restrict linear translation of the body relative to the cylindrical roller when the cylindrical roller is received in the interior space.

20 Claims, 6 Drawing Sheets

ROLLER COVERS AND ASSEMBLIES

FIELD

The present disclosure relates to roller covers.

BACKGROUND

Cylindrical rollers are used in a variety of applications and industries, such as in connection with material handling. For example, cargo aircraft and other aircraft with cargo holds typically include a floor with a plurality of cylindrical rollers to facilitate the translation of cargo along the floor. During manufacturing and/or maintenance of aircraft, floor boards may not be in place that otherwise, when present, cover sub-floor features. In such situations, personnel may be required to step on and/or around the sub-floor features to traverse a cargo handling area. Historically, cylindrical rollers have been taped to supporting housings to restrict the rotation of the cylindrical rollers during manufacturing and/or maintenance. Alternatively, large bulky boards, such as sheets of plywood, have been used to span and cover multiple cylindrical rollers and to provide a temporary floor to traverse a cargo handling area.

SUMMARY

Roller covers for use with cylindrical rollers include an elongate flexible hollow body, a first restrictive feature, and a second restrictive feature. The elongate flexible body defines an interior space with an opening to the interior space for receiving a cylindrical roller into the interior space via the opening. The body has a first conformation and a second conformation, and the body is biased toward the first conformation. The opening is larger when the body is in the second conformation than when the body is in the first conformation, and the body is configured to selectively flex about its longitudinal axis from the first conformation to the second conformation when being positioned over a cylindrical roller and then flex from the second conformation toward the first conformation upon receipt of a cylindrical roller within the interior space so that the cylindrical roller is captured within the interior space. The first restrictive feature extends from the body and is configured to restrict rotation of the body in a first rotational direction about its longitudinal axis when a cylindrical roller is received in the interior space. The second restrictive feature extends from the body and is configured to restrict rotation of the body in a second and opposite rotational direction about its longitudinal axis when a cylindrical roller is received in the interior space. Some embodiments further include a third restrictive feature that is positioned relative to the body and that is configured to restrict linear translation of the body along its longitudinal axis and relative to a cylindrical roller when received in the interior space.

DESCRIPTION

Roller covers and associated assemblies are disclosed herein, as are specific applications of roller covers, such as in connection with aircraft. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

As used herein, a "roller cover" is a structure that is configured to cover a cylindrical roller to provide a secure, stable surface for personnel to step on, such as during manufacturing and/or maintenance operations. Cylindrical rollers positioned to be stepped on, and thus covered by a roller cover, may take any suitable form and be used in various applications, industries, assemblies, apparatuses, etc.

Figure 1:
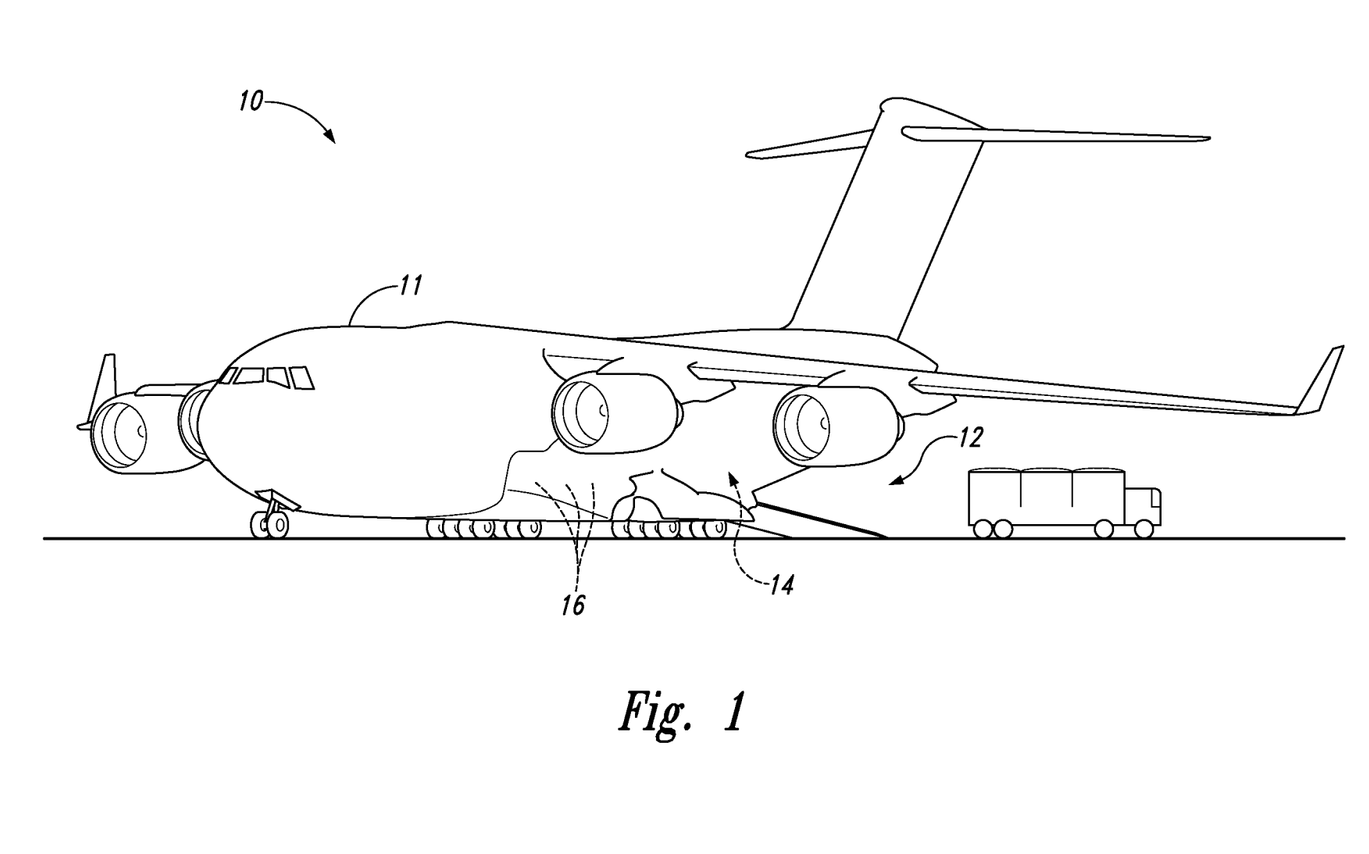
FIG. 1 is a perspective view of an aircraft, with which roller covers may be used.
Figure 2:
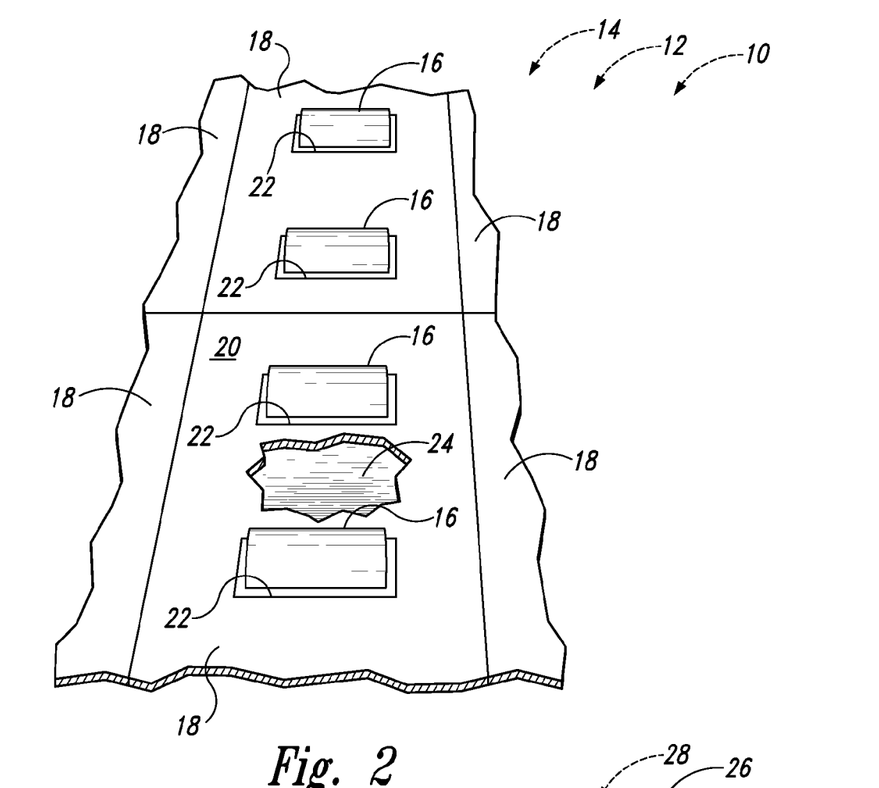
FIG. 2 is a perspective view of a cargo floor with rollers, with which roller covers may be used.

FIG. 1 illustrates an example aircraft 10, which may include a cargo bay, hold, or storage region 12 within the aircraft's fuselage 11. Cargo bays of aircraft often include a floor 14 that includes a plurality of cylindrical rollers 16 to facilitate the translation of cargo along the floor. FIG. 2 illustrates an example floor 14, which may be a cargo aircraft floor or other floor, that includes a plurality of cylindrical rollers 16 for the lateral translation of cargo. Some floors 14 also may include a plurality of floor boards, or support panels, 18 that define a floor surface 20. In some floors 14, the floor boards 18 may be removable, such as for maintenance of underlying structures, mechanisms, or systems associated with the cylindrical rollers 16. Additionally, the floor boards may individually or collectively define passages 22 through which the cylindrical rollers 16 at least partially extend above the floor surface 20. In connection with some floors 14, one or more floor boards 18, when installed, may span or otherwise cover a sub-floor feature 24, thereby providing a stable, safe floor surface on which personnel may step or otherwise perform work.

Figure 3:
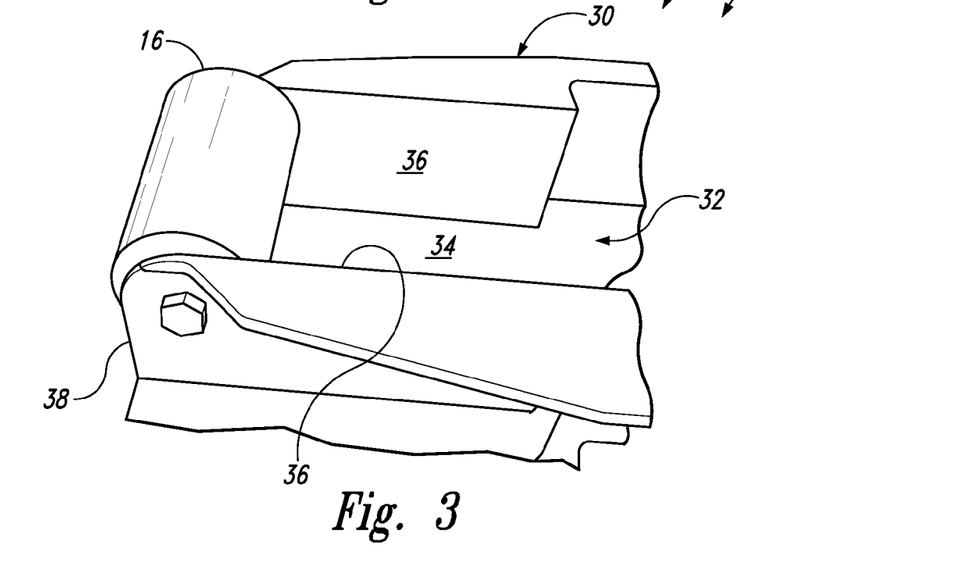
FIG. 3 is a perspective view of a portion of a power drive unit, with which a roller cover may be used.

FIG. 3 illustrates an example cylindrical roller assembly 26 that includes a cylindrical roller 16. As an illustrative, non-exclusive example, a cylindrical roller assembly 26 may take the form of a power drive unit, or PDU, 28 used in connection with aircraft cargo bay floors; however, other examples and applications of cylindrical roller assemblies 26 are within the scope of the present disclosure. In the example of FIG. 3, the assembly 26 may be described as including a housing 30 that supports the cylindrical roller 16. The housing 30 may be described as including, or defining, a channel, or trough, 32, for example with a planar surface 34 defining a bottom of the channel 32 and with a pair of spaced-apart (and optionally parallel) planar surfaces 36 defining sides of the channel 32. The planar surface 34 may be described as being parallel to the cylindrical roller's axis, and the planar surfaces 36 may be described as being transverse (and optionally perpendicular) to the cylindrical roller's axis.

Additionally, the example housing 30 of FIG. 3 may be described as including, or defining, an edge 38 that is spaced away from the cylindrical roller's axis and generally parallel to the cylindrical roller's axis. The edge 38 additionally or alternatively may be described as an edge, or terminus, of the channel 32. The edge may take any form, including a surface or a lip that generally spans a width of the housing 30, with the width defining a dimension parallel to the axis of the cylindrical roller 16.

Figure 4:
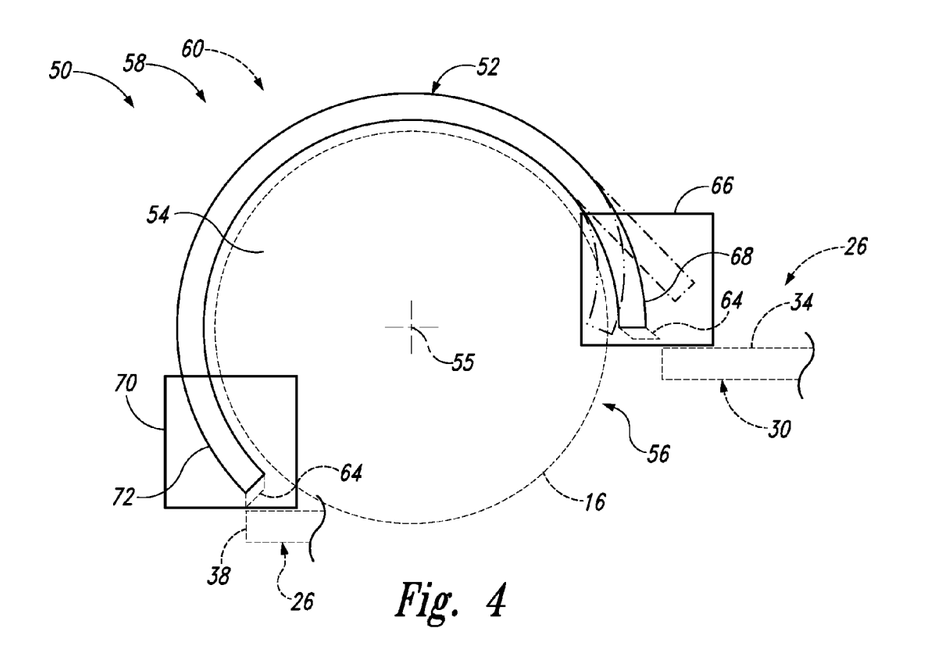
FIG. 4 is a schematic end view representing roller covers according to the present disclosure.
Figure 5:
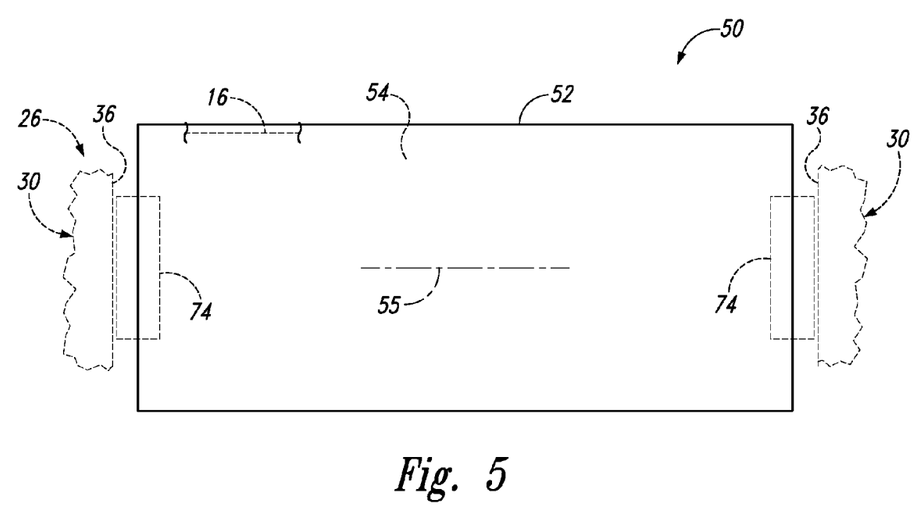
FIG. 5 is a schematic plan view representing roller covers according to the present disclosure.

Turning now to FIGS. 4-5, representations of roller covers 50 according to the present disclosure are schematically presented. Roller covers 50 are configured to cover a single cylindrical roller 16 to provide a stable surface on which a person may step, and thus to prevent, or at least restrict, a person from stepping directly on the cylindrical roller 16 itself, and additionally or alternatively may be described as roller clips or roller sheaths. FIG. 4 schematically represents roller covers 50 from a side perspective, covering a cylindrical roller 16, and relative to an optional housing 30. FIG. 5 schematically represents roller covers 50 from a top perspective and relative to an optional housing 30. Roller covers 50 may be described as including an elongate flexible hollow body 52. Body 52 defines an interior space 54 with an opening 56 to the interior space for receiving the cylindrical roller 16 into the interior space via the opening. The body 52 may be described as including a longitudinal axis 55 that is parallel to and optionally co-axial with the axis of a cylindrical roller 16 when received within the interior space of the body. While the body 52 is schematically illustrated in FIG. 4 as having a generally cylindrical form, such a configuration is not required in all embodiments of roller covers 50 according to the present disclosure. For example, the body 52 alternatively may have a polygonal profile. Any suitable configuration of body 52 may be provided such that the body defines an interior space and an opening through which a cylindrical roller may be received into the interior space.

The body 52 may be described as having at least two conformations, including a first conformation 58 represented in solid lines in FIG. 4 and a second conformation 60 represented with a portion of the body in dash-dot lines in FIG. 4. The body 52 is biased toward the first conformation 58, meaning that the body has an internal spring force that, when no external forces are applied to the body, results in or defaults to the first conformation. Stated differently, the body 52 automatically springs to the first conformation 58 absent the selective manipulation of the body and/or absent a cylindrical roller of a sufficient size being positioned within the interior space of the body. Accordingly, the first conformation 58 additionally or alternatively may be described as a default conformation or as a neutral conformation. A conformation of the body additionally or alternatively may be described as a configuration of the body.

As represented in dash-dot lines in FIG. 4, when the body 52 is in the second conformation 60, the opening 56 is larger than when the body is in the first conformation 58. More specifically, the body 52 is configured to selectively flex about the longitudinal axis 55 from the first conformation 58 to the second conformation 60, for example, when being positioned over a cylindrical roller 16. Moreover, the body 52 is further configured to then flex from the second conformation 60 toward the first conformation 58 upon receipt of a cylindrical roller 16 within the interior space 54 so that the cylindrical roller is captured within the interior space. Accordingly, typically (although not required), a roller cover 50 is used with a cylindrical roller 16 that has an outer diameter than is greater than a corresponding dimension of the opening 56. Accordingly, when installed on a cylindrical roller 16, the body 52 extends around greater than 50% of the cylindrical roller's outer surface. Additionally or alternatively, as optionally and schematically represented in FIG. 4, the body 52 may include edge portions 64 that define opposite sides of the opening 56 and that are angled, or flared, relative to directly adjacent portions of the body. Accordingly, in such embodiments, the edge portions 64 may facilitate the passage of a cylindrical roller 16 through the opening and thus the expansion of the opening as the cylindrical roller passes through the opening and is received into the internal space 54.

By flexing toward, rather than to, the first conformation 58, it is meant that in some applications, a cylindrical roller 16 may have an outer diameter that is greater than an internal dimension of the interior space 54, so that when the cylindrical roller is received in the interior space, the body 52 is prevented from returning fully to the first conformation. Such an optional configuration is schematically represented in FIG. 4 with a first conformation 58 represented in dash-dot-dot lines and intersecting the schematic representation of the cylindrical roller 16. In such optional configurations, the roller cover 50 may be described as remaining flexed against its bias when installed on a cylindrical roller 16; however, such a configuration is not required in all embodiments and uses of roller covers 50.

As schematically illustrated in FIG. 4, roller covers 50 also may include a first restrictive feature 66 that is configured to prevent, or at least restrict, rotation of the body 52 in a rotational direction about the longitudinal axis 55 when a cylindrical roller 16 is received in the interior space 54. From the perspective of FIG. 4, the first restrictive feature 66 restricts clockwise rotation of the roller cover 50. In FIG. 4, the first restrictive feature 66 is schematically represented as a box in an overlapping relationship with a terminal edge region 68 of the body 52 that defines one side of the opening 56, schematically representing that the first restrictive feature 66 may take any suitable form such that it restricts rotation of the roller cover 50 about its longitudinal axis 55, and that it may be integral with, extend from, be positioned adjacent to, or otherwise be associated with the terminal edge region 68. As schematically illustrated in FIG. 4, the first restrictive feature 66 more specifically may be configured to engage the planar surface 34 of a housing 30, thereby restricting rotation of the roller cover 50. In some embodiments, the body 52 and the first restrictive feature 66 may be constructed as a monolithic, or unitary, structure. As used herein, a "monolithic structure" refers to a structure that is formed from a single piece of material and is not an assembly of individual component parts that are joined together, such as by fasteners.

As schematically illustrated in FIG. 4, roller covers 50 also may include a second restrictive feature 70 that is configured to prevent, or at least restrict, rotation of the body 52 in a rotational direction about the longitudinal axis 55 when a cylindrical roller 16 is received in the interior space 54, with the second restrictive feature restricting rotation in an opposite direction as the first restrictive feature. From the perspective of FIG. 4, the second restrictive feature 70 restricts counterclockwise rotation of the roller cover 50. In FIG. 4, the second restrictive feature 70 is schematically represented as a box in an overlapping relationship with a terminal edge region 72 of the body 52 that defines one side of the opening 56 opposite the terminal edge region 68, schematically representing that the second restrictive feature 70 may take any suitable form such that it restricts rotation of the roller cover 50 about its longitudinal axis 55, and that it may be integral with, extend from, be positioned adjacent to, or otherwise be associated with the terminal edge region 72. As schematically illustrated in FIG. 4, the second restrictive feature 70 more specifically may be configured to engage the edge 38 of a housing 30, thereby restricting rotation of the roller cover 50. In some embodiments, the body 52 and the second restrictive feature 70 may be constructed as a monolithic, or unitary, structure, optionally together with the first restrictive feature 66.

As schematically illustrated in FIG. 5, some roller covers 50 also may include one or more third restrictive features 74 that are configured to restrict linear translation of the body 52 along the longitudinal axis 55 and relative to a cylindrical roller 16 when the cylindrical roller is received in the interior space 54. In FIG. 5, two spaced-apart third restrictive features 74 are schematically represented; however, it is within the scope of optional third restrictive features 74 that only a single third restrictive feature is present. Additionally or alternatively, a pair of spaced-apart features collectively may define, or be defined as, a third restrictive feature 74. In FIG. 5, the third restrictive feature(s) 74 are schematically represented as boxes in an overlapping relationship with the body 52, schematically representing that a third restrictive feature 74 may take any suitable form such that it restricts linear translation of the body along its longitudinal axis when a cylindrical roller 16 is received in the interior space 54. Moreover, a third restrictive feature 74 may be integral with and/or extend from one or more of the body 52, the first restrictive feature 66, and/or the second restrictive feature 70. As schematically illustrated in FIG. 5, a third restrictive feature more specifically may be configured to engage the planar surfaces 36 of a housing 30, thereby restricting linear translation of the roller cover 50. In some embodiments, the body 52 and the third restrictive feature(s) 74 may be constructed as a monolithic, or unitary, structure, optionally together with the first restrictive feature 66 and/or the second restrictive feature 70.

Roller covers 50 may be constructed of any suitable material, examples of which include (but are not limited to) plastics, thermoplastics, acrylonitrile butadiene styrene (ABS), nylons, or polycarbonates. Roller covers 50 optionally may be 3D-printed. Additionally or alternatively, roller covers 50 may be constructed of a material having a highly visible outer surface, such as a brightly colored surface. Additionally or alternatively, roller covers 50 may be painted, or otherwise coated, to include a highly visible outer surface, such as a brightly colored surface.

Turning now to FIGS. 6-14, an illustrative non-exclusive example of a roller cover 50, represented and referred to herein as a roller cover 100, is illustrated. Where appropriate, the reference numerals from the schematic illustrations of FIGS. 2-5 are used to designate corresponding parts of roller cover 100; however, the example of FIGS. 6-14 is non-exclusive and does not limit roller covers 50 to the illustrated embodiment of roller cover 100. That is, roller covers 50 are not limited to the specific embodiment of FIGS. 6-14, and roller covers 50 may incorporate any number of the various aspects, configurations, characteristics, properties, etc. of roller covers 50 that are illustrated in and discussed with reference to the schematic representations of FIGS. 2-5 and/or the embodiment of FIGS. 6-14, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to roller cover 100; however, it is within the scope of the present disclosure that the previously discussed features, variants, etc. may be utilized with roller cover 100.

Figure 6:
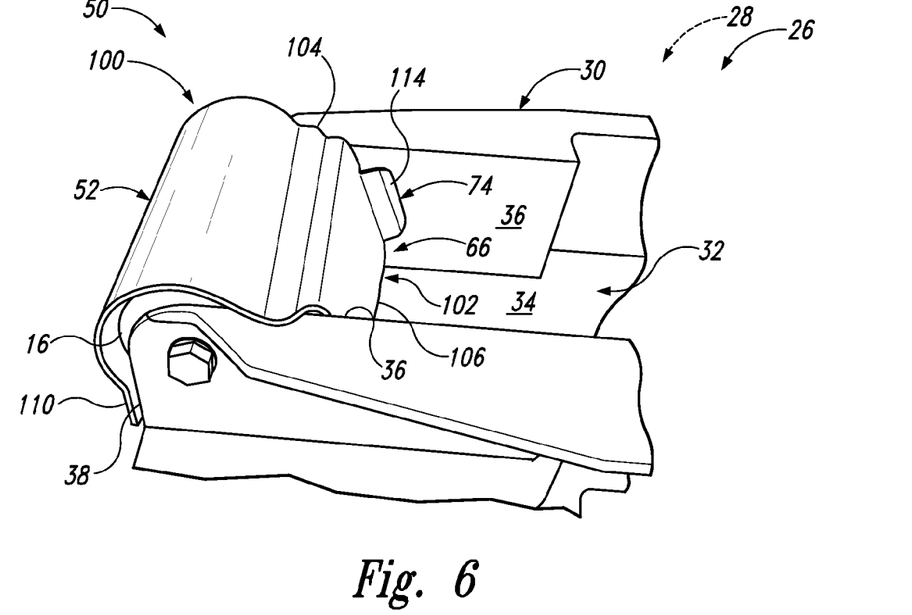
FIG. 6 is a perspective view of an illustrative, non-exclusive example of a roller cover installed on the example power drive unit of FIG. 3.
Figure 7:
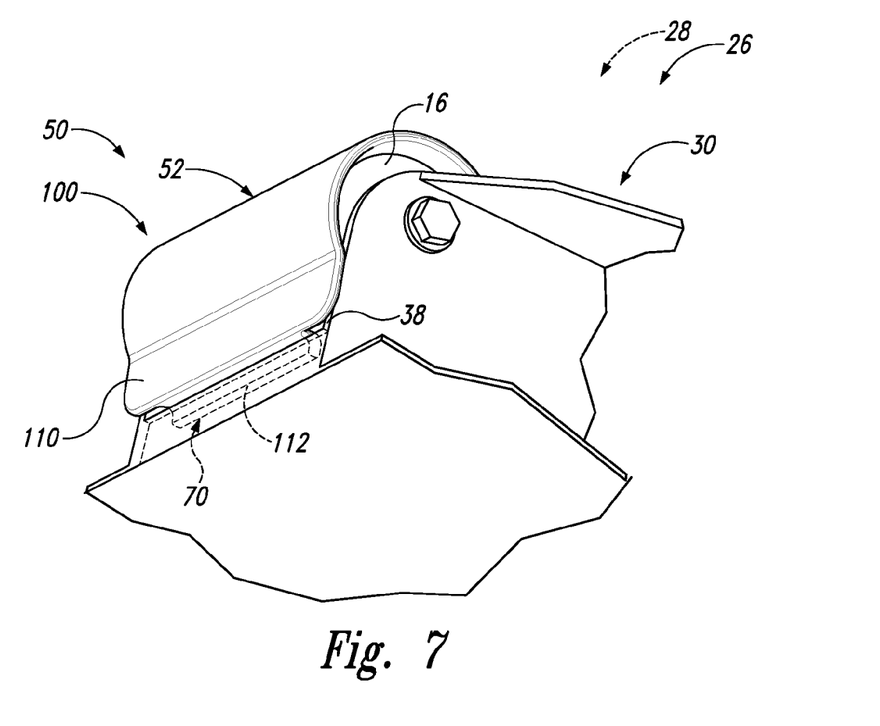
FIG. 7 is another perspective view of the roller cover of FIG. 6 installed on the example power drive unit of FIG. 3.
Figures 8, 9, 10:
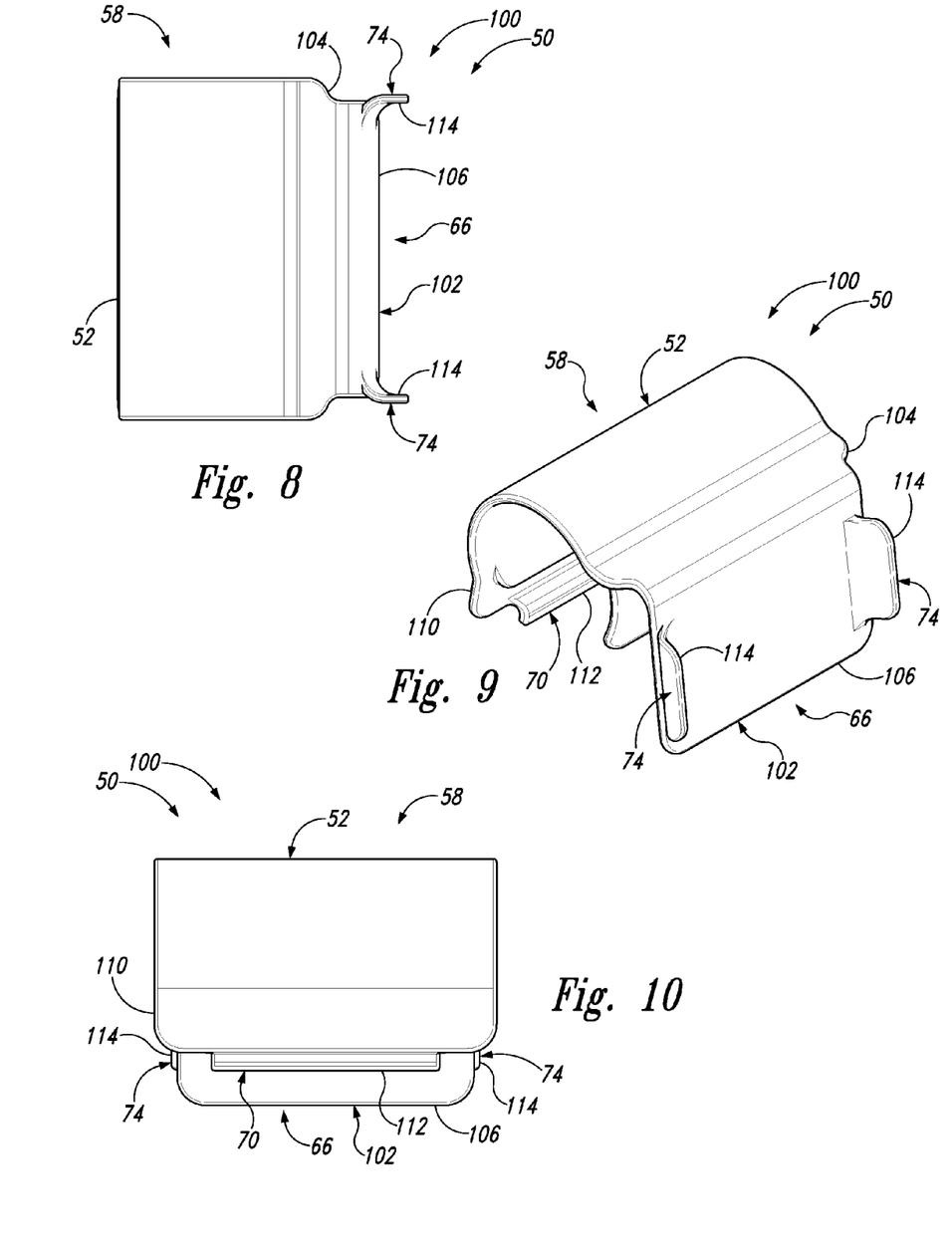
FIG. 8 is a side view of the roller cover of FIG. 6.
FIG. 9 is an isometric view of the roller cover of FIG. 6.
FIG. 10 is another side view of the roller cover of FIG. 6.

In FIGS. 6-7, the roller cover 100 is shown installed on a cylindrical roller assembly 26. The cylindrical roller 16 of the example cylindrical roller assembly 26 has a diameter that is slightly larger than an internal dimension of the roller cover's interior space 54. Accordingly, in FIGS. 6-7, the roller cover 100 is illustrated in a conformation between its first conformation 58 and its second conformation 60, as defined herein. In FIGS. 8-14, the roller cover 100 is shown by itself in a relaxed, or neutral, configuration, and thus in its first conformation 58.

Figure 11:
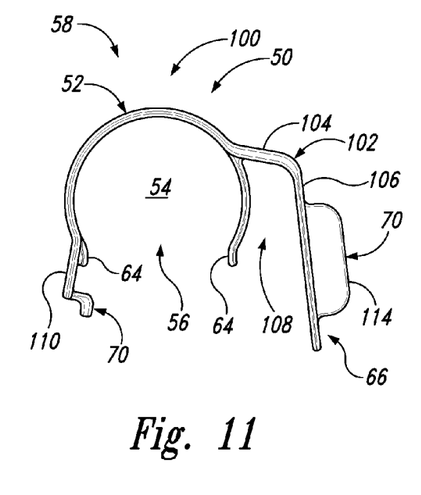
FIG. 11 is an end view of the roller cover of FIG. 6.
Figure 12:
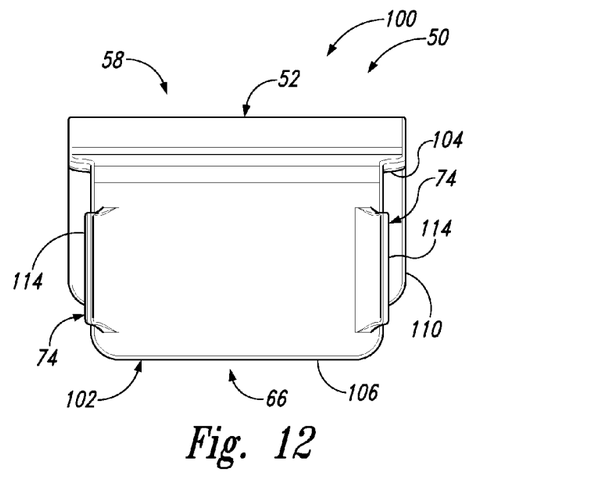
FIG. 12 is another side view of the roller cover of FIG. 6.
Figure 13:
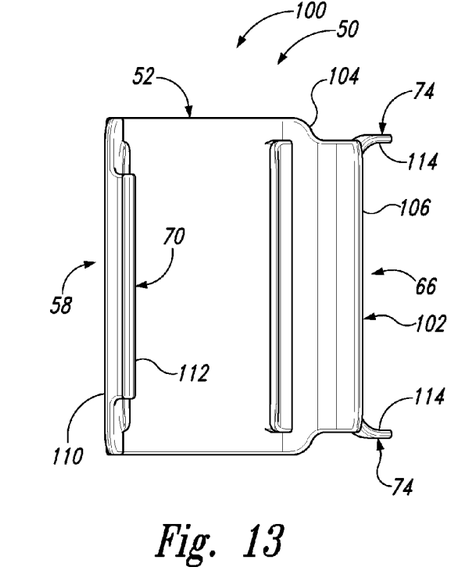
FIG. 13 is another side view of the roller cover of FIG. 6.
Figure 14:
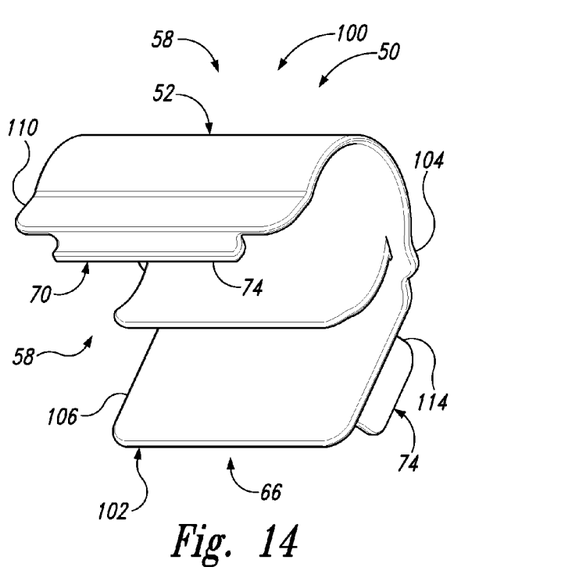
FIG. 14 is another isometric view of the roller cover of FIG. 6.

As perhaps best seen in FIG. 11, roller cover 100 is an example of a roller cover 50 that includes a generally cylindrical body 52 that extends approximately 250 degrees about its longitudinal axis, and with a flared opening 56 defined by edge portions 64 that are angled relative to directly adjacent portions of the body.

Roller cover 100 also is an example of a roller cover 50 that is constructed as a monolithic structure, including a first restrictive feature 66, a second restrictive feature 70, and a third restrictive feature 74.

The first restrictive feature 66 of the roller cover 100 includes an arm 102 that extends from the body 52 adjacent to one side of the opening 56. More specifically, the arm 102 includes a first portion 104 extending directly from the body and a second portion 106 extending at an angle relative to the first portion, and with the second portion therefore being spaced away from the body. Stated differently, the body 52 and the second portion 106 may be described as defining a gap, or space, 108 between the body and the second portion, as perhaps best seen in FIG. 11. Additionally or alternatively, the arm 102 may be described as having an L-shaped profile. As seen with reference to FIG. 6, the second portion 106 of the arm engages the planar surface 34 of the housing 30 when the roller cover 100 is installed on the cylindrical roller 16 of the cylindrical roller assembly 26.

The second restrictive feature 70 of the roller cover 100 includes a flange 110 that extends from the body 52 adjacent to an opposite side of the opening 56 relative to the first restrictive feature 66. More specifically, the flange 110 is at an angle relative to a directly adjacent portion of the body, and as perhaps best seen in FIG. 11, is adjacent to the adjacent edge portion 64 of the body. Additionally, the second restrictive feature 70 further includes an L-shaped lip 112 that extends from a terminus of the flange 110. As seen with reference to FIG. 7, the L-shaped lip 112 engages the edge 38 of the housing 30 when the roller cover 100 is installed on the cylindrical roller 16 of the cylindrical roller assembly 26.

The third restrictive feature 74 of the roller cover 100 includes a pair of spaced-apart tabs 114 that transversely extend from opposite side regions of the second portion 106 of the arm 102 of the first restrictive feature 66. As seen with reference to FIG. 6, the tabs 114 engage the spaced-apart planar surfaces 36 of the housing 30 when the roller cover 100 is installed on the cylindrical roller 16 of the cylindrical roller assembly 26.

Illustrative, non-exclusive examples of inventive subject matter according to the present disclosure are described in the following enumerated paragraphs:

A. A roller cover for use with a cylindrical roller, comprising:
    an elongate flexible hollow body defining an interior space with an opening to the interior space for receiving the cylindrical roller into the interior space via the opening, wherein the body has a longitudinal axis, wherein the body has a first conformation and a second conformation, wherein the body is biased toward the first conformation, wherein the opening is larger when the body is in the second conformation than when the body is in the first conformation, and wherein the body is configured to selectively flex about the longitudinal axis from the first conformation to the second conformation when being positioned over the cylindrical roller and then flex from the second conformation toward the first conformation upon receipt of the cylindrical roller within the interior space so that the cylindrical roller is captured within the interior space;
    a first restrictive feature extending from the body and configured to restrict rotation of the body in a first rotational direction about the longitudinal axis when the cylindrical roller is received in the interior space; and
    a second restrictive feature extending from the body and configured to restrict rotation of the body in a second rotational direction about the longitudinal axis when the cylindrical roller is received in the interior space, wherein the second rotational direction is opposite the first rotational direction.

A1. The roller cover of paragraph A, wherein the body, the first restrictive feature, and the second restrictive feature comprise a monolithic structure.

A2. The roller cover of any of paragraphs A-A1, wherein the roller cover is constructed as a monolithic structure.

A3. The roller cover of any of paragraphs A-A2, wherein the body is generally cylindrical and has an internal diameter that generally corresponds to, and optionally is less than, an outer diameter of the cylindrical roller.

A4. The roller cover of any of paragraphs A-A3, wherein the body extends around greater than 50% of an outer surface of the cylindrical roller when the cylindrical roller is received in the interior space.

A5. The roller cover of any of paragraphs A-A4, wherein the body includes edge portions that define opposite sides of the opening, wherein the edge portions are angled relative to directly adjacent portions of the body.

A6. The roller cover of any of paragraphs A-A5, wherein the first restrictive feature includes an arm that extends from the body adjacent to one side of the opening.

A6.1. The roller cover of paragraph A6, wherein the arm includes a first portion extending directly from the body and a second portion extending at an angle relative to the first portion, wherein the second portion is spaced away from the body.

A7. The roller cover of any of paragraphs A-A6.1, wherein the roller cover is for use with a cylindrical roller assembly that includes the cylindrical roller supported by a housing, wherein the housing includes a planar surface spaced away from and parallel to the axis of the cylindrical roller; wherein the first restrictive feature is positioned to engage the planar surface when the cylindrical roller is received in the interior space.

A7.1. The roller cover of paragraph A7 in combination with the cylindrical roller assembly, wherein the cylindrical roller is received in the interior space.

A7.1.1. The combination of paragraph A7.1 when depending from paragraph A6.1, wherein the second portion of the arm is engaged with the planar surface.

A8. The roller cover of any of paragraphs A-A7.1.1, wherein the second restrictive feature includes a flange that extends from the body adjacent to one side of the opening, or when depending from paragraph A6, wherein the second restrictive feature includes a flange that extends from the body adjacent to an opposite side of the opening.

A8.1. The roller cover of paragraph A8, wherein the flange extends at an angle relative to a directly adjacent portion of the body.

A8.2. The roller cover of any of paragraphs A8-A8.1, wherein the second restrictive feature further includes an L-shaped lip extending from a terminus of the flange.

A9. The roller cover of any of paragraphs A-A8, wherein the roller cover is for use with a cylindrical roller assembly that includes the cylindrical roller supported by a housing, wherein the housing includes an edge that is spaced away from and parallel to the axis of the cylindrical roller;
    wherein the second restrictive feature is positioned to engage the edge when the cylindrical roller is received in the interior space.

A9.1. The roller cover of paragraph A9 in combination with the cylindrical roller assembly, wherein the cylindrical roller is received in the interior space.

A9.1.1. The combination of paragraph A9.1 when depending from paragraph A8.1, wherein the flange is engaged with edge.

A10. The roller cover of any of paragraphs A-A9.1.1, further comprising:
    a third restrictive feature positioned relative to the body and configured to restrict linear translation of the body along the longitudinal axis and relative to the cylindrical roller when the cylindrical roller is received in the interior space.

A10.1. The roller cover of paragraph A10, wherein the body and the third restrictive feature comprise a monolithic structure.

A10.2. The roller cover of paragraph A10, wherein the body, the first restrictive feature, the second restrictive feature, and the third restrictive feature comprise a monolithic body.

A10.3. The roller cover of any of paragraphs A10-A10.2, wherein the third restrictive feature includes a pair of spaced-apart tabs that extend transverse to the longitudinal axis, and when depending from paragraph A6, wherein the pair of spaced-apart tabs extend transversely from opposite end regions of the arm.

A10.4. The roller cover of any of paragraphs A10-A10.3, wherein the roller cover is for use with a cylindrical roller assembly that includes the cylindrical roller supported by a housing, wherein the housing includes spaced-apart planar surfaces that extend transverse to the axis of the cylindrical roller;
    wherein the third restrictive feature is positioned to engage the spaced-apart planar surfaces when the cylindrical roller is received in the interior space.

A10.4.1. The roller cover of paragraph A10.4 in combination with the cylindrical roller assembly, wherein the cylindrical roller is received in the interior space.

A10.4.1.1. The combination of paragraph A10.4.1 when depending from paragraph A10.3, wherein the spaced-apart tabs are engaged with the spaced-apart planar surfaces.

A11. The roller cover of any of paragraphs A-A10.4.1.1, wherein the roller cover is constructed of a plastic, a thermoplastic, an acrylonitrile butadiene styrene (ABS), a nylon, or a polycarbonate.

A12. The roller cover of any of paragraphs A-A11, wherein the roller cover is 3D-printed.

A13. A method of manufacturing the roller cover of any of paragraphs A-A11, comprising: 3D-printing the roller cover.

A14. The use of the roller cover of any of paragraphs A-A12, optionally for covering rollers associated with a cargo aircraft floor, optionally during assembly of an aircraft, optionally during maintenance of an aircraft.

A15. The roller cover of any of paragraphs A-A12 in combination with a/the cylindrical roller assembly, wherein the cylindrical roller is received in the interior space.

A16. An aircraft, comprising:
a fuselage;
a cargo bay floor supported by the fuselage and including a plurality of cylindrical rollers; and
one or more of the roller cover of any of paragraphs A-A12 installed on one or more of the plurality of cylindrical rollers.

A16.1. The aircraft of paragraph A16, wherein the cargo bay floor further includes a plurality of removable floor boards, wherein the plurality of removable floor boards define passages through which the plurality of cylindrical rollers extend when the removable floor boards are in place, optionally wherein the passages are sized for the one or more of the roller cover to be in place on respective cylindrical rollers of the plurality of cylindrical rollers when the floor boards are in place, optionally wherein the passages are sized to permit installation and/or removal of the one or more of the roller covers on and/or from respective cylindrical rollers of the plurality of cylindrical rollers when the floor boards are in place.

A16.2. The use of the aircraft of any of paragraphs A16-A16.1, optionally during assembly of the aircraft, optionally during maintenance of the aircraft.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses disclosed herein are not required to all apparatuses according to the present disclosure, and the present disclosure includes all novel and non-obvious combinations and subcombinations of the various elements disclosed herein. Moreover, one or more of the various elements disclosed herein may define independent inventive subject matter that is separate and apart from the whole of a disclosed apparatus. Accordingly, such inventive subject matter is not required to be associated with the specific apparatuses that are expressly disclosed herein, and such inventive subject matter may find utility in apparatuses that are not expressly disclosed herein.

The invention claimed is:

1. A roller cover for use with a cylindrical roller, comprising:
an elongate flexible hollow body defining an interior space with an opening to the interior space for receiving the cylindrical roller into the interior space via the opening, wherein the body has a longitudinal axis, wherein the body has a length and an internal diameter, wherein the length is greater than the internal diameter, wherein the opening extends along the length and has a first side and a second side opposite the first side, wherein the body has a first conformation and a second conformation, wherein the body is biased toward the first conformation, wherein the opening is larger when the body is in the second conformation than when the body is in the first conformation, and wherein the body is configured to selectively flex about the longitudinal axis from the first conformation to the second conformation when being positioned over the cylindrical roller and then flex from the second conformation toward the first conformation upon receipt of the cylindrical roller within the interior space so that the cylindrical roller is captured within the interior space;
a first restrictive feature extending from the body along the length of the body to adjacent the first side of the opening, wherein the first restrictive feature is configured to restrict rotation of the body in a first rotational direction about the longitudinal axis when the cylindrical roller is received in the interior space; and
a second restrictive feature extending from the body adjacent the second side of the opening and along the length of the body, wherein the second restrictive feature is configured to restrict rotation of the body in a second rotational direction about the longitudinal axis when the cylindrical roller is received in the interior space, wherein the second rotational direction is opposite the first rotational direction.

2. The roller cover of claim 1, wherein the body, the first restrictive feature, and the second restrictive feature comprise a monolithic structure.

3. The roller cover of claim 1, wherein the body is generally cylindrical and the internal diameter generally corresponds to an outer diameter of the cylindrical roller.

4. The roller cover of claim 1, wherein the body includes edge portions that define opposite sides of the opening, wherein the edge portions are angled relative to directly adjacent portions of the body.

5. The roller cover of claim 1, wherein the first restrictive feature includes an arm that extends from the body along the length of the body adjacent to the first side of the opening.

6. The roller cover of claim 5, wherein the arm includes a first portion extending directly from the body and a second portion extending at an angle relative to the first portion, wherein the second portion is spaced away from the body.

7. The roller cover of claim 1, wherein the roller cover is for use with a cylindrical roller assembly that includes the cylindrical roller supported by a housing, wherein the housing includes a planar surface spaced away from and parallel to the cylindrical roller's axis;
wherein the first restrictive feature is positioned to engage the planar surface when the cylindrical roller is received in the interior space.

8. The roller cover of claim 7 in combination with the cylindrical roller assembly, wherein the cylindrical roller is received in the interior space.

9. The roller cover of claim 1, wherein the second restrictive feature includes a flange that extends from the body along the length of the body adjacent to the second side of the opening.

10. The roller cover of claim 9, wherein the flange extends at an angle relative to a directly adjacent portion of the body.

11. The roller cover of claim 9, wherein the second restrictive feature further includes an L-shaped lip extending from a terminus of the flange on a side of the flange facing the opening.

12. The roller cover of claim 1, wherein the roller cover is for use with a cylindrical roller assembly that includes the cylindrical roller supported by a housing, wherein the housing includes an edge that is spaced away from and parallel to the cylindrical roller's axis;
wherein the second restrictive feature is positioned to engage the edge when the cylindrical roller is received in the interior space.

13. The roller cover of claim 12 in combination with the cylindrical roller assembly, wherein the cylindrical roller is received in the interior space.

14. The roller cover of claim 1, further comprising:
a third restrictive feature positioned relative to the body and configured to restrict linear translation of the body along the longitudinal axis and relative to the cylindrical roller when the cylindrical roller is received in the interior space.

15. The roller cover of claim 14, wherein the body, the first restrictive feature, the second restrictive feature, and the third restrictive feature comprise a monolithic body.

16. The roller cover of claim 14, wherein the third restrictive feature includes a pair of spaced-apart tabs that extend transverse to the longitudinal axis from opposite end regions of the first restrictive feature.

17. The roller cover of claim 14, wherein the roller cover is for use with a cylindrical roller assembly that includes the cylindrical roller supported by a housing, wherein the housing includes spaced-apart planar surfaces that extend transverse to the cylindrical roller's axis;
wherein the third restrictive feature is positioned to engage the spaced-apart planar surfaces when the cylindrical roller is received in the interior space.

18. The roller cover of claim 17 in combination with the cylindrical roller assembly, wherein the cylindrical roller is received in the interior space.

19. An aircraft, comprising:
a fuselage;
a cargo bay floor supported by the fuselage and including a plurality of cylindrical rollers; and
one or more of the roller cover of claim 1 installed on one or more of the plurality of cylindrical rollers.

20. An assembly, comprising:
a cylindrical roller assembly that includes a cylindrical roller supported by a housing, wherein the housing includes a first planar surface spaced away from and parallel to the cylindrical roller's axis, and wherein the housing includes second and third spaced-apart planar surfaces that extend transverse to the cylindrical roller's axis; and
a roller cover, comprising:
an elongate flexible hollow and generally cylindrical body defining an interior space with an opening to the interior space for receiving the cylindrical roller into the interior space via the opening, wherein the cylindrical roller is received in the open space, wherein the body has a longitudinal axis, wherein the body has a length and an internal diameter that generally corresponds to an outer diameter of the cylindrical roller, wherein the length is greater than the internal diameter, wherein the opening extends along the length and has a first side and a second side opposite the first side, wherein the body has a first conformation and a second conformation, wherein the body is biased toward the first conformation, wherein the opening is larger when the body is in the second conformation than when the body is in the first conformation, and wherein the body is configured to selectively flex about the longitudinal axis from the first conformation to the second conformation when being positioned over the cylindrical roller and then flex from the second conformation toward the first conformation upon receipt of the cylindrical roller within the interior space so that the cylindrical roller is captured within the interior space;
a first restrictive feature extending from the body along the length of the body to adjacent the first side of the opening, wherein the first restrictive feature is configured to restrict rotation of the body in a first rotational direction about the longitudinal axis by engaging the first planar surface of the housing, wherein the first restrictive feature includes an arm that extends from the body adjacent to one side of the opening, wherein the arm includes a first portion extending directly from the body and a second portion extending at an angle relative to the first portion, and wherein the second portion is spaced away from the body;
a second restrictive feature extending from the body adjacent the second side of the opening and along the length of the body, wherein the second restrictive feature is configured to restrict rotation of the body in a second rotational direction about the longitudinal axis by engaging the housing, wherein the second rotational direction is opposite the first rotational direction, wherein the second restrictive feature includes a flange that extends from the body adjacent to an opposite side of the opening as the first restrictive feature, wherein the flange extends at an angle relative to a directly adjacent portion of the body, and wherein the second restrictive feature further includes an L-shaped lip extending from a terminus of the flange; and
a third restrictive feature positioned relative to the body and configured to restrict linear translation of the body along the longitudinal axis and relative to the cylindrical roller by engaging the second and third planar surfaces of the housing, wherein the third restrictive feature includes a pair of spaced-apart tabs that extend transversely from opposite end regions of the arm;
wherein the body, the first restrictive feature, the second restrictive feature, and the third restrictive feature comprise a monolithic structure.

* * * * *